June 7, 1932.  J. KLEFFMAN  1,861,479
ANIMAL TRAP
Filed May 14, 1931

Inventor
John Kleffman.
By Leo Stevens.
Attorney

Patented June 7, 1932

1,861,479

UNITED STATES PATENT OFFICE

JOHN KLEFFMAN, OF HIBBING, MINNESOTA

ANIMAL TRAP

Application filed May 14, 1931. Serial No. 537,230.

This invention relates to animal traps and the principal object is to produce a normally flat, open, trap susceptible of being adjusted so as to catch an animal when disposed vertically or horizontally.

Another object is to provide such a trap so constructed as to prevent any possibility of decapitating the animal caught.

Other objects and advantages of the invention will appear in the following description thereof.

Referring now to the accompanying drawing, forming part of this application, and wherein, like reference characters indicate like parts:

Figure 1:
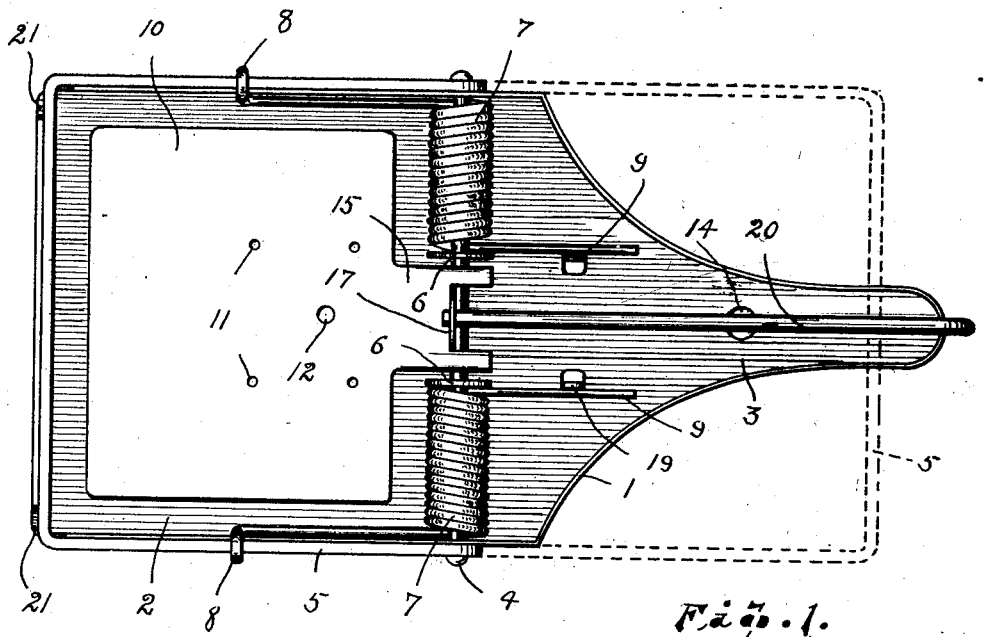
Figure 1 is a top plan view of one of the traps in sprung position.

The body portion of the trap is preferably stamped out of sheet metal and provided with an upstanding flange 1 wholly thereabouts, the main catching body portion 2 of the trap being preferably substantially rectangular and provided with a reduced handle shaped portion 3. Adjacent to and transverse the juncture of the handle portion with the catching portion is the transverse pin or shaft 4 which supports the U-shaped killing bar 5, the latter being mounted upon the ends of the shaft 4 externally of the flange 1 of the body portion.

Figure 2:
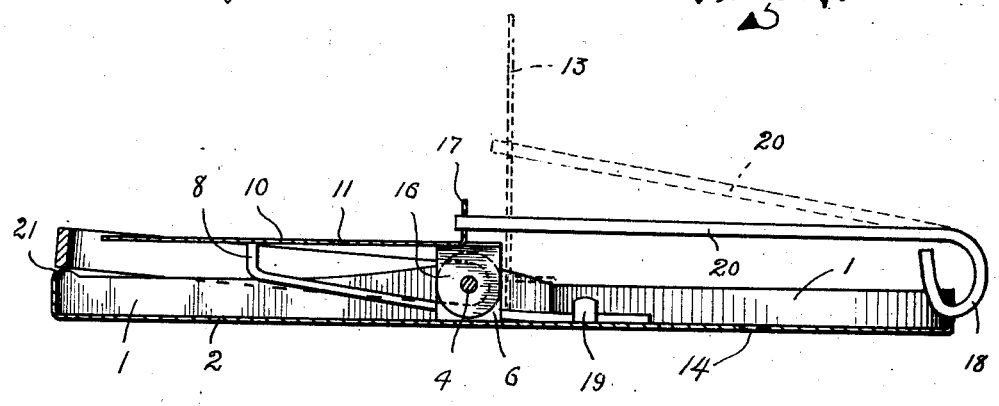
Figure 2 is a central longitudinal sectional view of Figure 1.

Spaced apart and one upon either side of the center line of the trap are the two upwardly extending lugs 6, struck from the metal of the body portion, and through which the shaft 4 extends, thus providing spaced central bearings for the bar, and intermediate of which and either side flange of the trap and upon the shaft 4 is mounted a helical spring 7 which forms the activating power of the trap. One end of each spring 7 extends forwardly of the shaft 4, that is when the killing bar is in sprung position, and is turned at right angles so as to hook over the killing bar as at 8, and the opposite end lies prone upon the bottom of the handle portion, as at 9, so that when the bait is turned over backwardly into set position against the handle as illustrated in dotted lines, Figure 1, the springs will be contracted ready for action when the trigger wire or pin 20 is released by the tipping downwardly of the pan 10. The preferred construction of the latter pan approaches the size of the interior of the catching body portion of the trap, is rectangular in shape, and provided with a plurality of spaced holes 11 for convenient attachment of a bait and a central hole 12 for the reception of the trigger wire 20 when disposed at right angles to the body portion of the trap as illustrated in dotted lines at 13, Figure 2 of the drawing.

This latter positioning of the pan occurs only when the trap is to be suspended as from a nail through the hole 14 in the handle portion when it is desired to set the trap where a bird may otherwise be tempted to spring same, and in which instance the bait of course is suspended from the under side of the pan instead of the upper, as is the case when the trap is positioned prone upon the ground, in which event the large pan will hide the bait from above.

The pivotal connection of the pan upon the shaft 4 intermediate of the bearing lugs 6 is accomplished by the pan having the central extension 15 thereupon with downwardly turned lugs 16 bent at right angles thereto and provided with suitable holes through which the shaft extends. Intermediate of the sides of the extension 15 and from the extreme end portion thereof is struck upwardly the lug 17, provided with a central hole suitable for the reception of the end of the trigger wire 20 when the pan is set in its position parallel with the body portion.

The pivotal end of the trigger pin or wire is accomplished by the loop formed therein being engaged within a suitable hole in the flange of the handle portion as illustrated at 18, and as guiding means for the ends 9 of the spring 7 there is illustrated lugs 19 struck upwardly from the body portion and against which the termini 9 may contact; however such lugs may or may not be employed, as desired.

A further novel feature of the device is that the forward corners of the flange 1 of the body portion are arched upwardly as at 21 for engagement with the killing bar as it descends upon the animal being caught, preventing the direct engagement or cooperation of the bar with the marginal edge of the flange, which, if such was the case, might result in the complete severing of the head and neck for example, or decapitating, of a fur bearing animal and thus destroy the pelt.

I am aware that somewhat similar combinations of elements have been employed in a trap, but without having the novel features herein specifically described and set forth in the appended claims which are deemed to constitute an entirely novel functioning of such a trap.

Having thus described my invention, what I claim and desire to secure by Letters Patent, is:

1. An animal trap comprising a base portion having an upstanding flange about one end and the sides thereof, a transverse bar pivotally mounted in said flange and extending therethrough, a U-shaped killing bar mounted upon said transverse bar externally of said flanges and engageable with said end flange when sprung, springs upon said transverse bar one end engaging the killing bar and the other the base, a bait pan pivotally mounted upon said transverse bar, and means for setting the trap.

2. An animal trap comprising a base portion having side and end flanges the corners thereof being upwardly arched, a transverse bar mounted in said side flanges, a killing bar mounted upon said transverse bar a portion of said killing bar extending in substantially the same plane as said end flange and contacting said corners only when the trap is sprung.

In testimony whereof I affix my signature.

JOHN KLEFFMAN.